United States Patent [19]

Lill

[11] 4,097,157
[45] Jun. 27, 1978

[54] VEHICLE WHEEL ALIGNER FOR MEASURING FRONT WHEEL TOE WITH RESPECT TO THE REAR WHEEL AXIS OF ROTATION

[75] Inventor: Melvin H. Lill, San Jose, Calif.
[73] Assignee: FMC Corporation, San Jose, Calif.
[21] Appl. No.: 773,639
[22] Filed: Mar. 2, 1977
[51] Int. Cl.$^2$ ............................................. G01B 11/26
[52] U.S. Cl. ..................................... 356/152; 33/288; 356/155
[58] Field of Search ................... 33/288; 356/152, 155

[56] References Cited

U.S. PATENT DOCUMENTS

| | | | |
|---|---|---|---|
| 2,706,427 | 4/1955 | Carrigan | 356/155 |
| 3,337,961 | 8/1967 | Holub | 33/288 |
| 3,865,492 | 2/1975 | Butler | 356/155 |
| 3,963,352 | 6/1976 | Rishovd et al. | 356/152 |

*Primary Examiner*—S. C. Buczinski

*Attorney, Agent, or Firm*—L. B. Guernsey; R. S. Kelly; C. E. Tripp

[57] ABSTRACT

A light projector mounted on a front wheel of a vehicle provides a pair of light beams. The first light beam is projected to a roof mirror mounted on an adjacent rear wheel and is reflected to a first target mounted with the projector on the front wheel of the vehicle. The toe angle of the front wheel relative to the axis of rotation of the rear wheel of said vehicle is calculated from signals which are developed by said first target. The second light beam is projected to a mirror mounted on the other front wheel and is reflected to a second target mounted adjacent to the projector to determine the total toe angle between the front wheels. The difference between the total toe angle and the measured individual toe angle of the front wheel upon which the projector is mounted is calculated to provide the individual toe angle of the other front wheel relative to said axis of rotation of the rear wheel of the vehicle.

6 Claims, 8 Drawing Figures

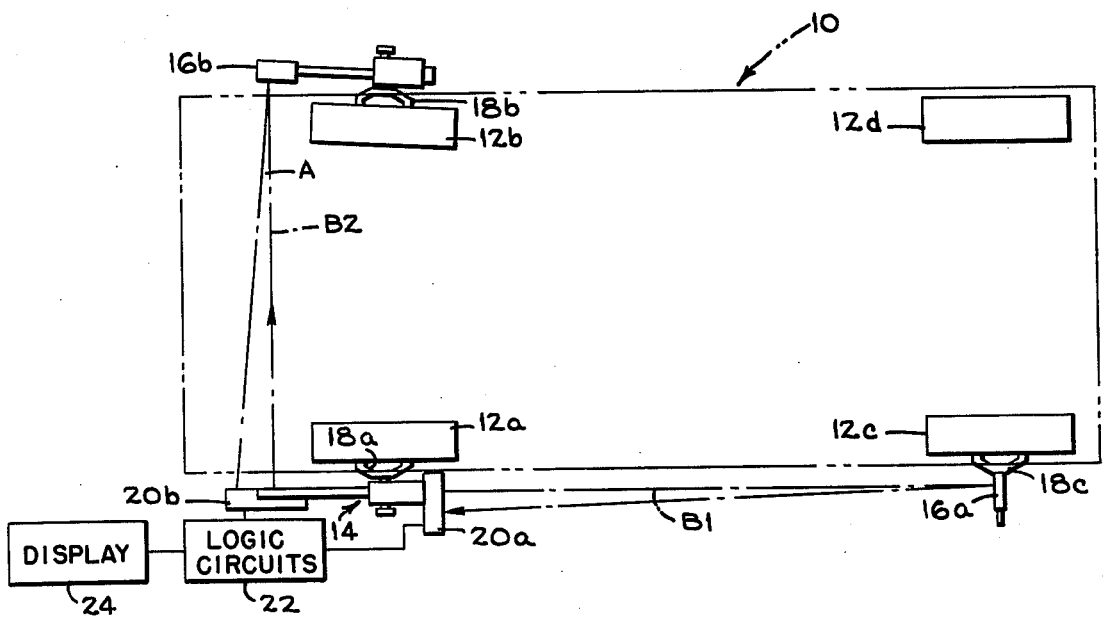
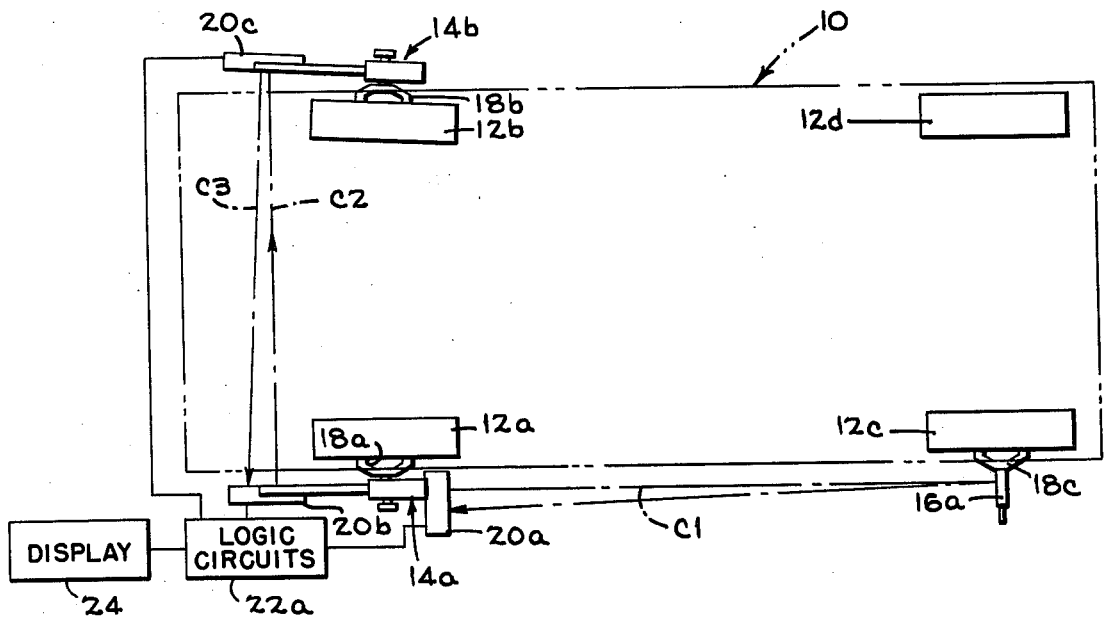

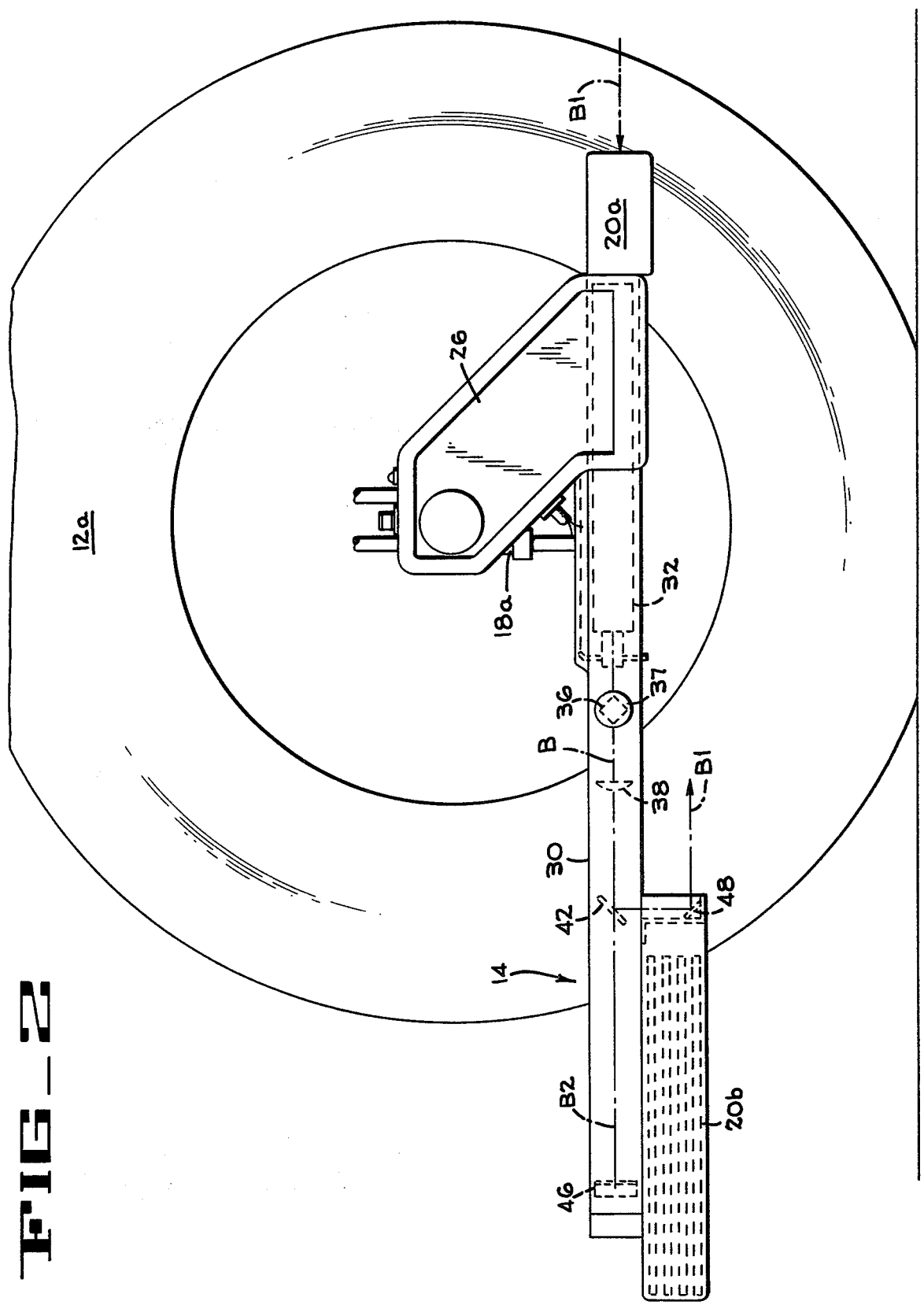

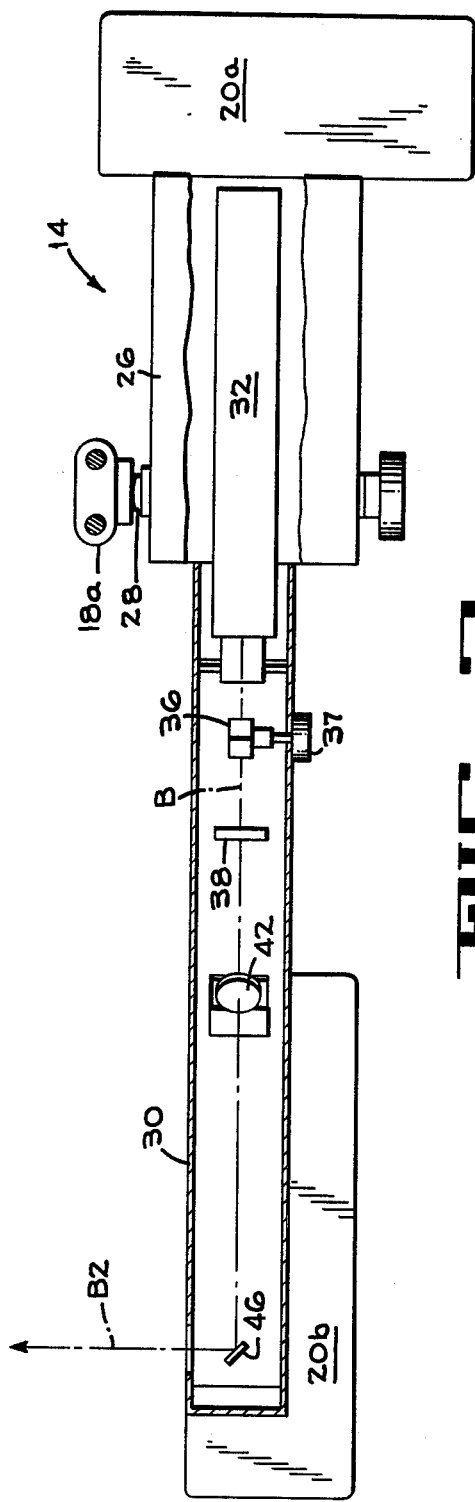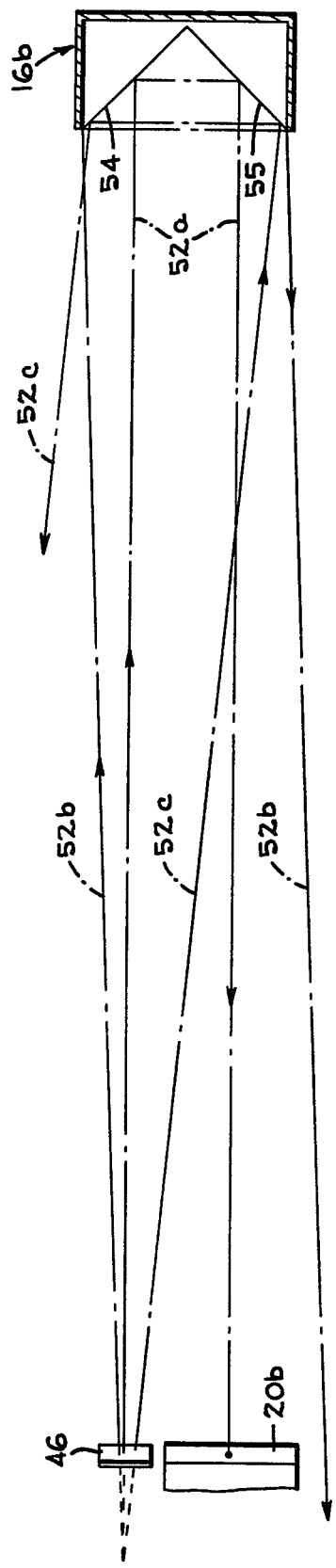

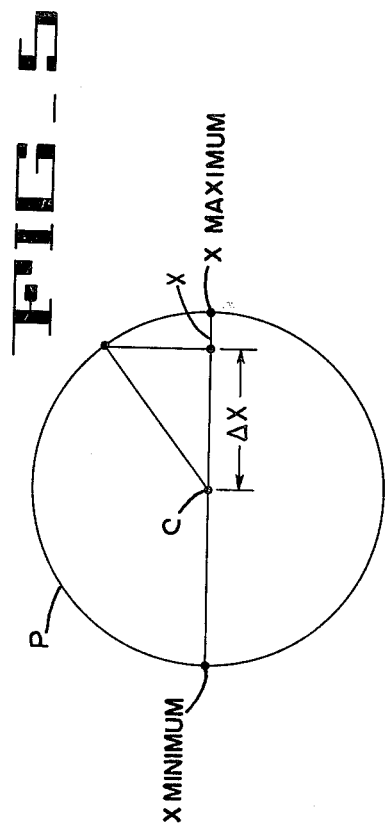
FIG_5
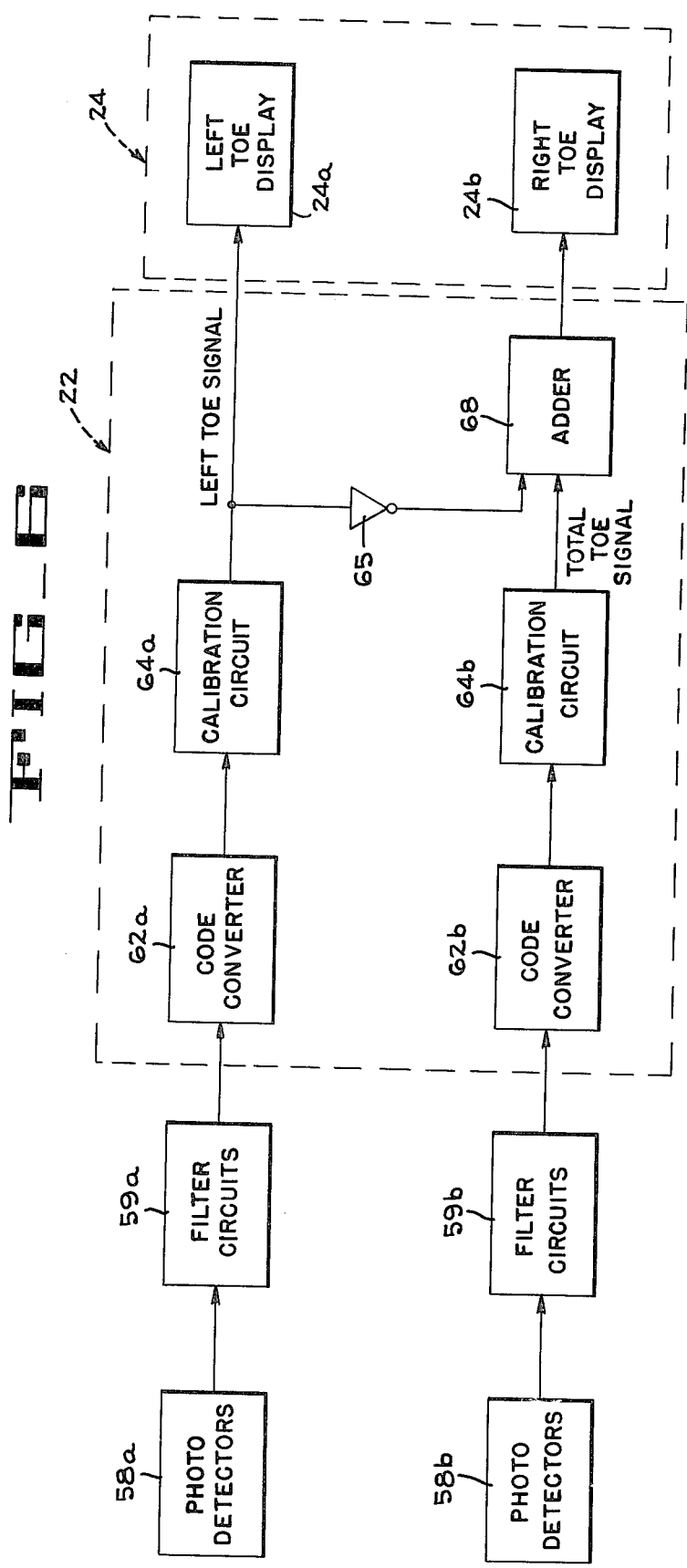
FIG_6

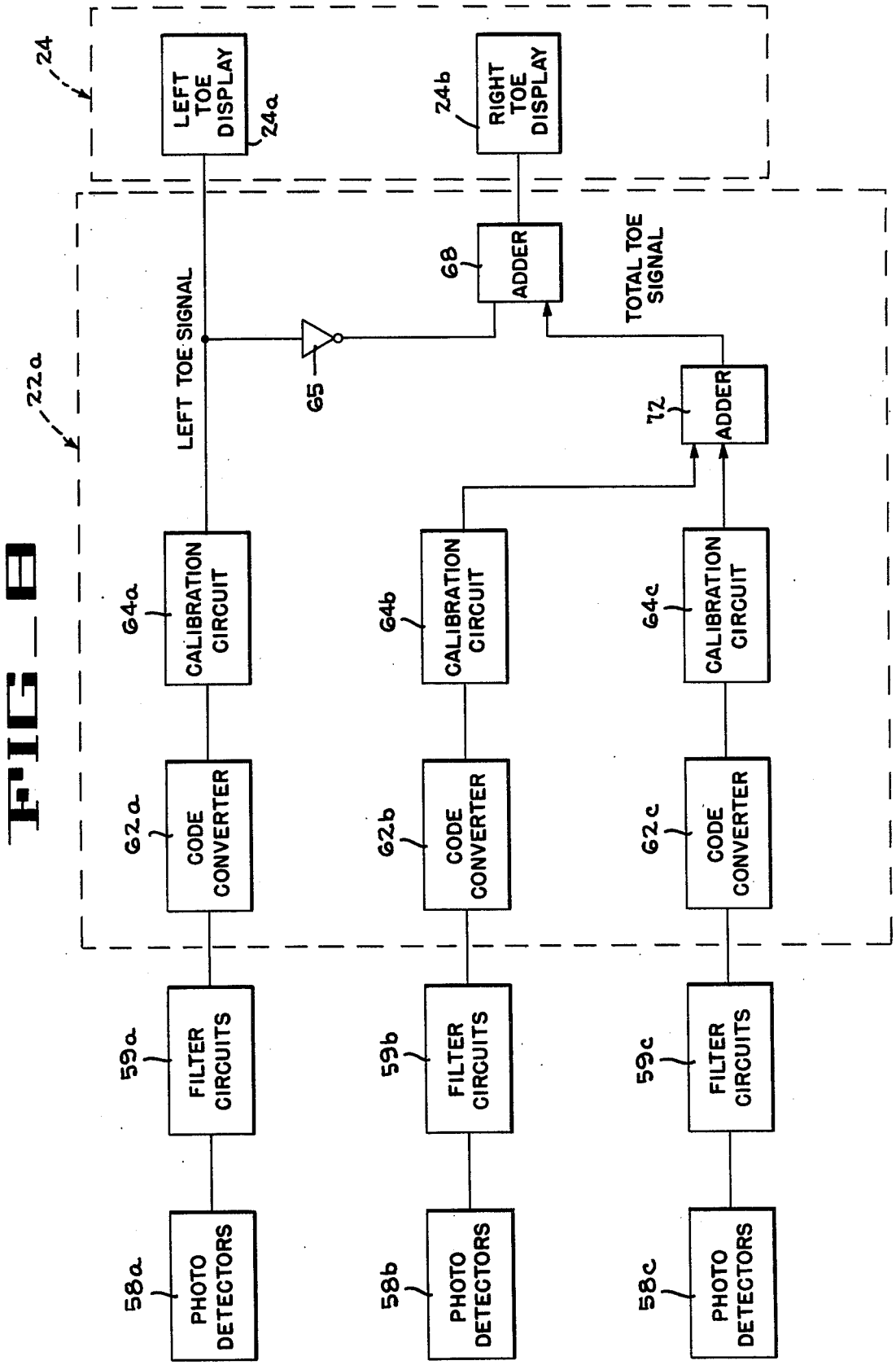

VEHICLE WHEEL ALIGNER FOR MEASURING FRONT WHEEL TOE WITH RESPECT TO THE REAR WHEEL AXIS OF ROTATION

BACKGROUND OF THE INVENTION

1. Field of the Invention

The present invention pertains to vehicle wheel aligning apparatus, and more particularly, it pertains to wheel-mounted aligning systems which measure the toe angles of each of the front wheels of a motor vehicle.

2. Description of the Prior Art

In checking the wheel alignment angles of the front wheels of a motor vehicle, various types of mechanical, optical and electrical devices have been utilized in the prior art. In apparatus of the optical type, which is widely utilized by the automotive servicing industry today, some optical mechanism (e.g, a mirror or a light beam projector) is placed upon one of the wheels and the spacial orientation of such mechanism is determined to thereby provide an indication of the spacial orientation of the wheel upon which the optical mechanism is mounted. The wheel alignment angles normally determined by such wheel alignment apparatus are the front wheel toe, camber and caster angles. It is with the determination of the toe angles, i.e., the angles at which each of the front wheels are turned in a horizontal plane, that the present invention is concerned In one form of toe angle measuring apparatus which has achieved widespread usage in the automotive servicing industry during recent years, a projector is mounted upon each of the front wheels so as to direct a light beam to a target mounted upon the other front wheel. The position wherein the beams strike the targets is then utilized in various ways to determine the relative spacial orientations of the two projectors and, hence, the toe angle between the two front wheels. Examples of such cross-toe projection systems are found in prior U.S. Pat. Nos. 3,393,455 to MacMillan, 3,865,492 to Butler, 3,782,831 to Senften, and 3,953,134 to Appel et al.

In each of the alignment systems described in the aforementioned prior art patents, individual front toe angles (i.e., the angle which each wheel makes with the longitudinal centerline of the front suspension of the vehicle) are obtained since projectors are mounted upon each of the two front wheels. No means are provided, however, for referencing such toe angles to any other portion of the vehicle. Hence, while the correct toe angle between the front wheels will be properly set with the apparatus disclosed in the prior art, the steering wheel may not be set in the proper position for correct steering relative to the measured front wheel toe angles. In using the prior art tow angle measuring devices this deficiency was remedied in various ways. Typically, sighting devices were provided upon the projectors so that the operators could sight along the rear wheel sidewalls or to specially placed targets located upon or adjacent to the rear wheels so that the projection systems would be aligned with or centered with respect to the rear wheels of the vehicle. Such sighting devices were not particularly accurate unless the operator was both careful in following the alignment procedures and well skilled in the use of the alignment apparatus—a situation which was not often the case. Other prior art alignment systems make use of special targets placed upon the rear wheels to measure the angles between the front wheel-mounted projectors and the targets thus referencing the front wheel toe angles to the rear axle of the vehicle; such systems require, however, reflected beam measuring means for both rear wheels in addition to the front wheel cross-toe measuring means.

SUMMARY OF THE INVENTION

With the apparatus of the present invention individual front wheel toe angles are determined with such toe angles being referenced to the axis of rotation of only one of the rear wheels of the vehicle—typically, such axis of rotation will be coincident with the rear axle. Thus, the operator need not provide special target devices or beam measuring means along both sides of the car in order to obtain accurate readings of the individual front wheel toe angles relative to the running centerline of the vehicle.

In accordance with the present invention, a mirror is mounted upon one of the rear wheels in a predetermined position relative to the axis of rotation of the wheel, and an alignment means is mounted upon the front wheel of the vehicle on the same side of the car as said rear wheel. A light beam is projected from the alignment means to the mirror which reflects the beam back to the alignment means. The alignment means includes a target for receiving the reflected beam and means associated with the target for calculating the toe angle of the front wheel relative to the axis of rotation of the rear wheel. The alignment means further includes a means for projecting a beam across the front of the vehicle toward the other front wheel with means being provided upon said other front wheel for receiving the projected beam. Calculating means are then provided, such means being responsive to the positions of both of the projected beams, for calculating the total toe angle between the two front wheels and then for subtracting the toe angle of the first wheel (as provided by the rearwardly projected beam) to determine the individual toe angle of the other front wheel.

The present system may be operated either with a cross toe system of the type disclosed in the aforementioned prior art patents wherein projectors are provided on both front wheels, or, in may be utilized with a cross toe system which comprises only a single projector on one of the front wheels and a reflecting mirror upon the other front wheel. The alignment system of the present invention is particularly useful in an optoelectronic aligning system wherein measurements are obtained optically and the calculations determined wholly electronically with appropriate readouts being provided for the operator.

BRIEF DESCRIPTION OF THE DRAWINGS

FIG. 1 is a diagrammatic plan view of a motor vehicle showing the wheel alignment apparatus of the present invention mounted in operative position upon the wheels of the vehicle.

FIG. 2 is a side elevation of the light projector and photodetector target portion of the apparatus of the present invention showing such apparatus in operative position mounted on a vehicle front wheel.

FIG. 3 is a top plan view of the wheel alignment apparatus shown in FIG. 2 with portions thereof being broken away.

FIG. 4 is a diagrammatic illustration of the manner in which the light beams are reflected between the projector apparatus of FIGS. 2 and 3 and the mirror which is mounted upon the opposite front wheel of the vehicle.

FIG. 5 is a tracing of the path of a light beam on a target when one of the wheels is rotated.

FIG. 6 is a schematic diagram of the electronic circuitry of the wheel alignment apparatus of the present invention shown in FIG. 1.

FIG. 7 is a diagrammatic plan view of a motor vehicle showing another embodiment of the wheel alignment apparatus of the present invention.

FIG. 8 is a schematic diagram of the electronic circuitry used in the embodiment of the invention disclosed in FIG. 7.

DESCRIPTION OF THE PREFERRED EMBODIMENT

Referring now more particularly to the drawings, the plan view of FIG. 1 will be seen to disclose a conventional four-wheel vehicle 10 having a light projector 14 secured to the left front wheel 12a by a mounting bracket 18a. The projector 14 develops a pair of beams, one of which is projected in a rearward direction toward a mirror 16a that is secured to the left rear wheel 12c of the vehicle by a mounting bracket 18c. The mirror 16a reflects the first beam, B1, back toward the projector 14 to a photodetector target 20a which is mounted at the rear of the projector. The returning beam causes the target 20a to develop a position indication signal which is coupled to a logic circuit 22. The logic circuit provides signals to a display 24 which causes the display to generate a visual presentation of the toe angle of the left front wheel 12a relative to the axis of rotation of the left rear wheel. A second beam of light, B2, is directed across the front of the vehicle by the projector 14 to a front wheel mirror 16b which is mounted on the right front wheel 12b by a mounting bracket 18b, similar to the mounting brackets 18a and 18c. The light beam which strikes the mirror 16b is reflected back toward the projector to a photodetector target 20b which is mounted on the underside of the projector 14 at its forward end. This returning beam causes the target to develop a position indication signal which is also coupled to the logic circuit 22. The logic circuit computes the toe angle between the right and left front wheels and, with the previously determined toe angle of the left front wheel, determines the toe angle of the right front wheel relative to the axis of rotation of the left rear wheel of the vehicle. The logic circuit then provides signals to the display 24 which causes the display to generate a visual presentation of the toe angle of the right front wheel 12b.

The light beam projector 14, which is disclosed in detail in FIGS. 2 and 3, includes a housing 26 that is adapted to be supported upon a laterally projecting supporting shaft 28 of the wheel mounting bracket 18a. The shaft is rotatably mounted in the projector housing so that the body of the projector will swing freely about the axis of the shaft. The wheel mounting bracket 18a is a conventional type of mounting bracket that is available for attachment to the wheels of motor vehicles. The details of one such mounting bracket which may be used with the apparatus of the present invention are shown in U.S. Pat. No. 3,709,451 to Graham. In constructing the projector 14 the weight should be distributed fore and aft of the pivot point (axis of shaft 28) so that the projector will hang in a horizontal orientation as shown in FIG. 2. Attached to and supported within the lower end of the housing 26 of the projector is a barrel 30. Enclosed in barrel 30 is a laser 32 which provides a laser beam B that is split into two beams B1 and B2 as shown in FIG. 2. One of the beams, B1, is directed to the mirror 16a on the rear wheel of the vehicle while the other beam, B2, is directed to the mirror 16b on the opposing front wheel. Mounted forwardly of the laser 32 is a rotating prism 36 that is arranged to be continuously rotated by motor 37 so that the beam B will be continuously swept in a repetitive motion in a vertical plane. A cylindrical lens 38 is mounted outwardly of the rotating prism to provide the proper vertical sweep of the beams B1 and B2 at the targets 20a and 20b. Mounted forwardly of the lens 38 in the path of the beam B is the beam splitter which is comprised of a half-silvered mirror 42 that splits the beam and directs one-half of the beam at right angles downwardly to a mirror 48 positioned directly below the mirror 42. The mirror 48, in turn, reflects the beam B1 at right angles and directs it to the rear mirror 16a. The other half B2 of laser beam B passes through the mirror 42 along the axis of barrel 30. Mounted at the forward end of barrel 30 is a mirror 46 which reflects the split laser beam B2 at right angles to direct it to the mirror 16b on the opposed vehicle wheel. The photodetector target 20b is attached to the lower face of the barrel 30 and positioned directly below the mirror 46 at the outer end of the barrel. The photodetector target 20a is attached to the rearward end of the barrel 30 adjacent the lower end of the housing 26.

The targets 20a and 20b are each comprised of a plurality of horizontally arranged, parallel light pipes which the vertically swept beams B1 and B2 cut across. The outer surfaces of the pipes are masked in a predetermined Gray code pattern so that the beam is received within and conducted along only certain of the pipes depending on the position (in the horizontal plane) that the beam strikes the target. A photosensitive cell is provided at the end of each of the light pipes, and the photosensitive cells determine (by conventional Gray code logic) the horizontal position of the reflected beam on the target. The construction and operational details of such targets are fully shown in the co-pending U.S. Pat. application by Thomas E. Roberts, Jr. et al, U.S. Application Ser. No. 773,638 filed Mar. 2, 1977, and such application is specifically incorporated by reference herein. Details of the construction and operation of the projector 14 are also more fully disclosed in the aforementioned patent application to Roberts et al.

The basic operation of the wheel alignment apparatus of the present invention will now be described. The steering wheel of the vehicle 10 (FIG. 1) should be set in the straight ahead position with the straight ahead position being midway between the end lock positions of the steering wheel and with the steering wheel crossbar being in a horizontal position. The left front tie-rod should then be adjusted to set one-half of the desired total toe of the front wheels into the toe of the left front wheel. For example, if the desired toe reading for the two wheels of the vehicle is +2° the tie-rod on the left front wheel is adjusted so that the beam B1 returns to the target 20a to produce a reading of +1° which is displayed as the left toe on the display 24. After the left wheel has been adjusted, the cross beam B2 from the projector 14 to the mirror 16b on the right front wheel is utilized. This beam will strike the mirror 16b and be reflected to the photodetector target 20b. The beams striking the targets 20b and 20a causes the logic circuit 22 to develop signals which are coupled to the display 24 and displayed as the right toe of the vehicle. The tie-rod for the right front wheel is then adjusted until it produces the desired reading, i.e., +1°. This procedure thus sets one-half of the desired toe adjustment into each of the front wheels of the vehicle.

The laser beam B from the projector 14 provides a small spot of light which is periodically swept in the vertical plane as previously pointed out. The beams B1 and B2 that are sent to both the rear wheel 12c and the front wheel 12b are swept in a repetitive vertical motion so that each beam will periodically be reflected from its mirror 16a or 16b at the correct elevation to strike the corresponding target from the top to the bottom thereof. This vertical deflection of each of the front and rear beams is produced by the rotating prism 36, the operation of which is explained in detail in the aforementioned co-pending patent application of Thomas E. Roberts, Jr. et al.

The mirrors 16a and 16b which are used to reflect the light to and from the projector between the wheels of the vehicle are each, preferably, comprised of a roof mirror as shown in FIG. 4. Each of these mirrors include a pair of reflecting surfaces 54 and 55 mounted at a 90° angle to each other. Due to the 90° angle between the reflecting surfaces, any incident light beam that strikes one of the surfaces will be reflected to the other surface and then reflected back toward the source with the reflected beam being parallel to the incident beam as viewed looking horizontally toward and normal to the beam as in FIG. 4. This is true no matter what the plane of the reflective surfaces is relative to a horizontal plane so long as the incident beam is reflected off both surfaces. Any tilting of the mirror, by rotating it either clockwise or counterclockwise from the position shown in FIG. 4, will vary the spacing between the incident beam and the reflected beam, but it will not change the spacial angle at which the beam is reflected back toward the source. Thus, roof mirror 16b, as shown in FIG. 4, is mounted on the right front wheel, and the mirror is adjusted to reflect light from the flat mirror 46 to the photodetector target 20b. As shown in FIG. 4, the mirror 16b should be chosen so that the undeflected beam 52a, which strikes the mirror 46 in its center, strikes the approximate mid-portion of upper surface 54 and is reflected from the approximate mid-portion of the surface 55 so that it will strike the center of the photodetector target 20b. As shown in FIG. 4, when the beam swings upwardly (due to the rotating prism 36) to follow path 52b (which strikes the upper edge of surface 54) the reflected beam will be below the target 20b; and, as the beam swings to follow path 52c (which strikes the lower edge of surface 55) the reflected beam will be well above the target. Thus, the normal swing of the beam will cause a vertical sweep of the reflected beam at the target which will be well above and below the target so that even if the projector 14 and mirror 16b are not perfectly oriented in the same horizontal plane a portion of the reflected beam will still sweep across the target.

The light beam periodically sweeping across the target causes the photosensitive elements in the target to develop signal pulses with the frequency of the pulses being equal to the rate at which the beam sweeps across the target. Ambient light may also cause the photosensitive elements in the target to produce voltages which could interfere with the desired output signals. Conventional filter circuits 59a and 59b (FIG. 6), which are tuned to the frequency of the generated pulses, are connected to receive the signals produced by the photodetectors in the target and thereby separate the signal frequency from any spurious signals which are developed by the ambient light. Thus, the vertical sweeping beam not only insures that the projected beam strikes the corresponding target 20a or 20b but causes signals to be developed in the photodetectors at a particular frequency which can be recognized and separated from spurious signals. Targets which may be used to convert the vertically sweeping beams B1 and B2 into a plurality of Gray code binary output signals indicative of the horizontal positions of the beams are disclosed in the aforementioned patent application of Thomas E. Roberts, Jr. et al. The signals from the targets, which are generated in Gray binary code, may be converted by Gray code-to-binary converters 62a, 62b into a standard binary code (as shown in the circuitry of FIG. 6) to calculate the value of the toe angles.

As with most of the motor vehicle alignment devices presently in use in the automotive servicing industry, in the apparatus heretofore described the angle of the toe of the wheels is calculated by measuring a distance rather than by directly measuring an angle although it should be appreciated that the apparatus of the present invention is not limited to any particular type of optical cross toe reading device and may include devices which provide readings directly in terms of angles. The distance measurement of the described device can be seen by referring to FIG. 1. When the beam of light leaves projector 14 at right angles and strikes the mirror 16b so that the return beam is reflected through the angle A in the horizontal plane, the distance in the horizontal plane between the point where the beam leaves the projector and the point where the beam returns to the target 20b is the deflected distance which is directly measured by the target. If the wheels 12a and 12b were moved further apart without changing their spacial orientation (i.e., if they were on a wider vehicle) the measured distance would become larger although the angle A of the reflected beam B2 would remain the same. A true value of the toe reading may be obtained by introducing a known angle of deflection into the apparatus to calibrate the apparatus for vehicles having different wheel spacings. Details of a calibration circuit 64a, 64b (FIG. 6) which uses the measured values of deflection to provide a correction value for these different wheel spacings are disclosed in the aforementioned patent application of Thomas E. Roberts, Jr. et al. This calibration circuit is utilized in conjunction with a wedge-shaped prism (not shown) which is selectively inserted into the path of the laser beam to deflect the beam a predetermined amount, the details of such prism also being shown in the aforementioned patent application of Thomas E. Roberts, Jr. et al.

It is desirable that the projector 14 be mounted with the supporting shaft 28 aligned precisely with the rotary axis of the wheel 12a upon which it is mounted so that the beam B from the projector will always remain in a plane parallel to the plane of the wheel as the wheel is rotated. However, the projector is mounted upon a conventional mounting bracket 18a which is, in turn, clamped to the wheel. It is very difficult to attach the mounting bracket to the wheel so that it is exactly parallel to the plane of the wheel. Therefore, when the wheel is rotated the axis of the supporting shaft will typically generate a conical surface of revolution generally about the axis of the wheel. This causes the projector to wobble so that the central ray of the laser beams which are projected from the projector will follow a circular path in the plane of the targets as shown by path P in FIG. 5.

This path is commonly known as the "run-out circle". A similar runout circle will be generated by mirror 16a or 16b when the wheel on which it is mounted is rotated. At any instant of time the position of the beam in the "run-out circle" will be a horizontal distance $\Delta X$ away from the center location C where it would be if the supporting shaft 28 of the projector was mounted in line with the rotary axis of the left wheel; thus, the distance $\Delta X$ in any given rotative wheel position represents an error which must be added to or subtracted from the obtained horizontal deflection reading X in that rotative position of the wheel in order to provide a correct value of the horizontal deflection. The correct value may be found by rotating the wheel slowly to obtain the maximum horizontal deflection value on the toe display (X maximum), then rotating to obtain a minimum horizontal deflection value on the toe display (X minimum), then calculating the average deflection as the mid-point between the minimum and maximum readings, and then rotating the wheel once more to stop the wheel at this calculated average value. This should be done for each of the wheels 12a, 12b and 12c having a mirror or a light beam projector mounted thereon in order to assure that no "run-out" errors will cause the obtained toe angle readings to be inaccurate.

The circuit shown in FIG. 6 may be used to calculate the individual values of the toe angles for the right and left front wheels of the vehicle. The value of left toe is calculated and displayed by a plurality of photodetectors 58a, a set of filters 59a, a Gray-to-binary code converter 62a, a calibration circuit 64a and a left toe display 24a—all of such components and their functions having been previously discussed. The photodetectors 58a, which are mounted on the target 20a, develop a plurality of binary signals that pass through the filter circuits 59a and are converted from Gray code into the standard binary code by the converter circuitry 62a. The calibration circuit 64a receives the binary coded distance measurement and provides an output signal in terms of an individual left wheel toe angle which is indicated to the operator on display 24a. The left toe display 24a therefore comprises a conventional digital/analog readout device which numerically displays the value of the angle between the left front wheel 12a and a line parallel to the longitudinal axis of the vehicle with such longitudinal axis being assumed to be at right angles to the axis of rotation (rear axle) of the rear wheel 12c.

The photodetectors 58b on the target 20b and the associated components 59b, 62b and 64b develop signals which represent the total toe angle between the left front wheel 12a and the right front wheel 12b, such components determining the total toe angle in the same manner that the left toe angle was determined by circuitry 58a-64a. Then, in accordance with the present invention, the left toe angle signal from the circuit 64a is inverted by an inverter 65 and applied to an adder 68 where it is added to the total toe angle signal from calibration circuit 64b. The negative value of left toe signal when added to the value of the total toe signal (i.e., total toe-left toe) provides a right toe angle signal in digital form which is applied to a right toe display 24b (similar to 24a) so that it can be viewed by the operator.

The wheels of a vehicle such as shown in FIG. 1 may be aligned with the apparatus of the present invention by sequentially performing the following steps:

1. With the projector 14 mounted on the left front wheel 12a, the mirror 16a mounted on the left rear wheel 12c and the mirror 16b mounted on the right front wheel 12b, jack up the left rear wheel 12c. Rotate the left rear wheel, observing the maximum right and left horizontal deflection readings on the left toe display 24a, stopping the wheel at the location where the display provides the average deflection reading. Lower the left rear wheel to the ground without changing its rotative position. This procedure eliminates the runout error in the mounting of the left rear mirror 16a.

2. Jack up the left front wheel 12a and rotate it as aforedescribed to obtain the maximum right and left horizontal deflection readings on the left toe display 24a. Stop the wheel with the reflected beam B1 at the average horizontal deflection reading on the left toe display 24a. Lower the left front wheel to the ground without changing its rotative position. This procedure eliminates the runout error in the mounting of the projector 14 and targets 20a, 20b.

3. Jack up the right front wheel 12b and repeat the sequence of step number 2 for this wheel this time observing the maximum right and left horizontal deflection readings on the right toe display 24b.

4. Set the steering wheel of the vehicle in straight ahead position midway between the left lock and the right lock positions.

5. Adjust the left front tie-rod until the rearwardly directed light beam B1 returns to the rear target 20a at a position such that the display 24a indicates a left toe value equal to one-half the desired total toe for the two front wheels.

6. Adjust the right tie-rod until the right toe display 24b shows a value equal to one-half the desired total toe for the two front wheels.

Another embodiment of the present invention is disclosed in FIG. 7. This embodiment is similar to the first described embodiment and is comprised of similar opto-electronic angular measuring equipment except that in the FIG. 7 embodiment a light beam projector and target is placed on both front wheels rather than just on one of the wheels as in the FIG. 1 embodiment. Thus, a pair of projectors 14a and 14b are provided each being mounted upon a respective one of the front wheels 12a and 12b by a mounting bracket 18a, 18b. The projector 14a develops a pair of beams, one of which, C1, is projected to a mirror 16a on the adjacent rear wheel 12c and reflected back to a target 20a located at the rear of the projector—all as described in connection with the apparatus of FIG. 1. A second beam of light, C2, is directed across the front of the vehicle by the projector 14a to a target 20c which is secured at the forward end of the projector 14b. The target 20c develops a toe angle signal which is determined by the relative rotative position of the left wheel 12a. The projector 14b develops a beam of light C3 which is directed across the front of the vehicle to the target 20b which is mounted at the forward end of the projector 14a. A toe angle signal developed by the target 20b is determined by the relative rotative position of the right wheel 12b. The toe angle signals from the targets 20b and 20c are then added together to obtain a total toe angle signal indicating the angle between the left front wheel 12a and the right front wheel 12b. Thus, the combination of targets 20b and 20c in the FIG. 7 embodiment provides a total toe angle signal the same as that provided by the target 20b alone in the FIG. 1 embodiment.

The operation of the projectors 14a and 14b of FIG. 7 is the same as the operation of the projector 14 of FIG. 1. As shown in the circuit diagram of FIG. 8, each of the angle measuring circuits includes photodetectors 58a, 58b, 58c, filter circuits 59a, 59b, 59c, code converters 62a, 62b, 62c, and calibration circuits 64a, 64b, 64c—such components being identical to the similarly numbered components described in connection with the embodiment of FIG. 1. As shown in FIG. 8, the front toe signals derived from the targets 20b and 20c are directed to an adder 72. The adder 72 combines these signals to produce a total toe signal. The total toe signal and an inverted, or negative, value of left toe signal as derived from target 20a are added together by an adder 68 to provide the right toe signal to display 24b.

The procedure for aligning the front wheels of the vehicle 10 shown in FIG. 7 is the same as the procedure for aligning the front wheels of the vehicle shown in FIG. 1. In each of these embodiments the left front wheel is accurately aligned with respect to the left rear wheel first. The total toe angle between the left front wheel and the right front wheel is then obtained. Finally, the left front toe angle is subtracted from the obtained total toe angle in order to calculate the toe angle of the right front wheel.

It will be recognized that while the foregoing description is directed to a particular opto-electronic angle measuring device (i.e., light beam projector 14 and associated Gray-coded beam receiving target 20) the present invention is not to be limited to any particular type of angle measuring device and may utilize any one of a number of available devices where a light beam, or beams, is projected between the wheels of a vehicle and detection means are provided to determine or reference the beam direction. It is only necessary that the angle measuring device for measuring the toe angles of the front wheels be of the optical type (i.e., light beam projecting) and include electronic calculating means or the like so that the calculations necessary to provide the individual toe angles of both front wheels can be automatically performed.

Although the best modes contemplated for carrying out the present invention have been herein shown and described, it will be apparent that modification and variation may be made without departing from what is regarded to be the subject matter of the invention.

What is claimed is:

1. Apparatus for measuring the front wheel toe angles of a motor vehicle having pairs of front and rear wheels, said apparatus comprising alignment means adapted to be mounted upon one of said front wheels of the vehicle in a predetermined position with respect to the axis of rotation of said one front wheel, a mirror adapted to be mounted upon the rear wheel of said vehicle on the same side of the vehicle as said one front wheel, said mirror being mounted in a predetermined position with respect to the axis of rotation of said rear wheel, said alignment means including means for projecting a beam of light to said mirror, said alignment means further including means for receiving the reflected beam of light from said mirror and for calculating the toe angle of said one front wheel relative to said axis of rotation of said rear wheel in accordance with the position of the received light beam, means mounted upon one of the front wheels of the vehicle for projecting a beam across the front of the vehicle toward the other front wheel of said vehicle, means mounted upon said other front wheel of said vehicle for projecting a beam across the vehicle toward said one front wheel, means responsive to the positions of said projected beams for providing a signal proportional to the total toe angle between said two front wheels of the vehicle, means connected to said last named means for calculating the total toe angle between said two front wheels of the vehicle, and logic means connected to both of said calculating means for subtracting the toe angle of said one front wheel from the total toe angle and for providing an output reading of the toe angle of the other of said front wheels with respect to said axis of rotation of said rear wheel.

2. Apparatus for measuring the front wheel toe angles of a motor vehicle according to claim 1 wherein said means for providing a signal proportional to the total toe angle between said two front wheels comprises target detector devices provided on each of said front wheels to receive the beams projected from the opposite ones of said front wheels and to provide an output signal.

3. Apparatus for measuring the front wheel toe angles of a motor vehicle according to claim 2 wherein said means for providing a signal proportional to the total toe angle between said two front wheels further comprises means for adding together the signals from said target detector devices.

4. Apparatus for measuring the front wheel toe angles of a motor vehicle according th claim 1 wherein said means for providing a signal proportional to the total toe angle between said two front wheels comprises a target detector device on said one front wheel to receive the beam projected from said other front wheel, said means on said other front wheel for projecting a beam comprising a mirror to reflect said beam projected across the front of the vehicle from said one front wheel.

5. Apparatus for measuring the front wheel toe angles of a motor vehicle according to claim 1 wherein both of said calculating means provide signals in digital form representative of said toe angles of said two front wheels.

6. Apparatus for measuring the front wheel toe angles of a motor vehicle according to claim 5 wherein said logic means includes an inverter for receiving the signals from one of said calculating means, said logic means further including adding means for receiving the output of said inverter and the signal from the other of said calculating means and for adding them together to provide a signal representative of said toe angle of the other of said front wheels.

* * * * *